Nov. 10, 1931.  C. KOSTER  1,831,124
WORK CARRIER
Filed Jan. 2, 1930   2 Sheets-Sheet 1
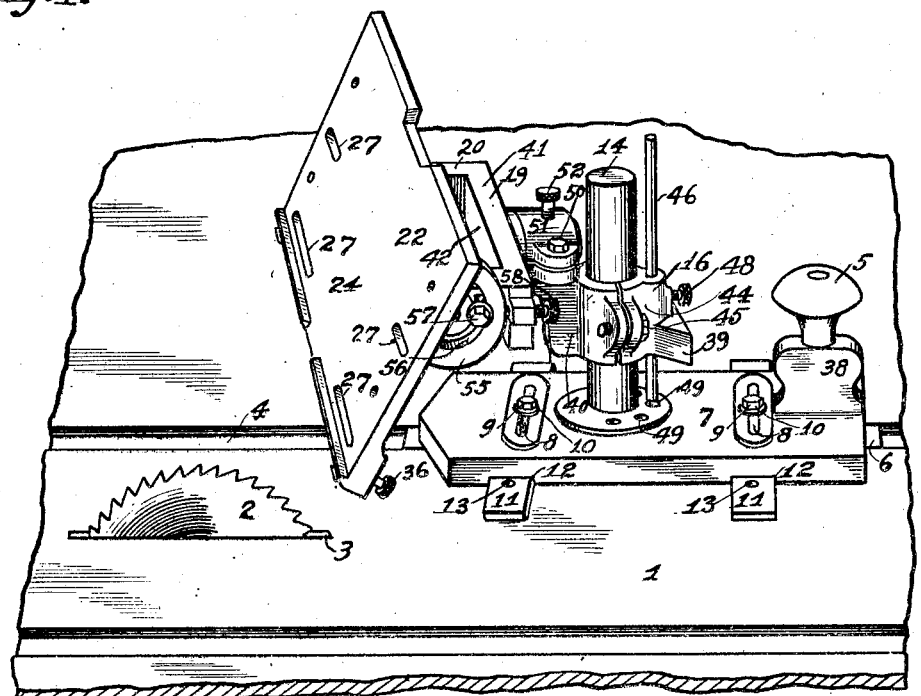

Nov. 10, 1931.  C. KOSTER  1,831,124
WORK CARRIER
Filed Jan. 2, 1930   2 Sheets-Sheet 2

INVENTOR.
Cornelius Koster
BY Rice and Rice
ATTORNEYS.

Witness:

Patented Nov. 10, 1931

1,831,124

UNITED STATES PATENT OFFICE

CORNELIUS KOSTER, OF GRAND RAPIDS, MICHIGAN

WORK CARRIER

Application filed January 2, 1930. Serial No. 417,853.

The present invention relates to work carriers for wood-working machines; and its object is to provide an improved mechanism of that character whereby the workpiece may be carried through the machine's field of operation while held in any of several different adjusted positions.

This and any other and more specific objects hereinafter appearing are attained by, and the invention finds preferable embodiment in, the mechanical structure hereinafter particularly described in the body of this specification and illustrated by the accompanying drawings, in which:

Figure 1 is a view in perspective of a work carrier applied to a sawing machine;

Figure 2 is a side elevational view thereof, certain parts being shown in central vertical longitudinal section and other parts being turned to another position;

Figure 3:
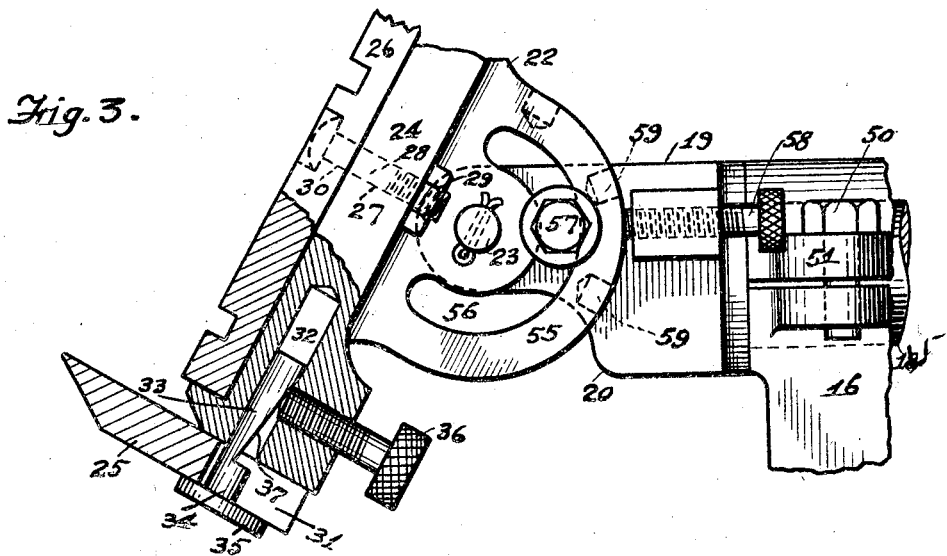
Figure 3 is a side elevational view of certain parts of the same, shown partially in vertical section and turned to a different position.
Figure 4:
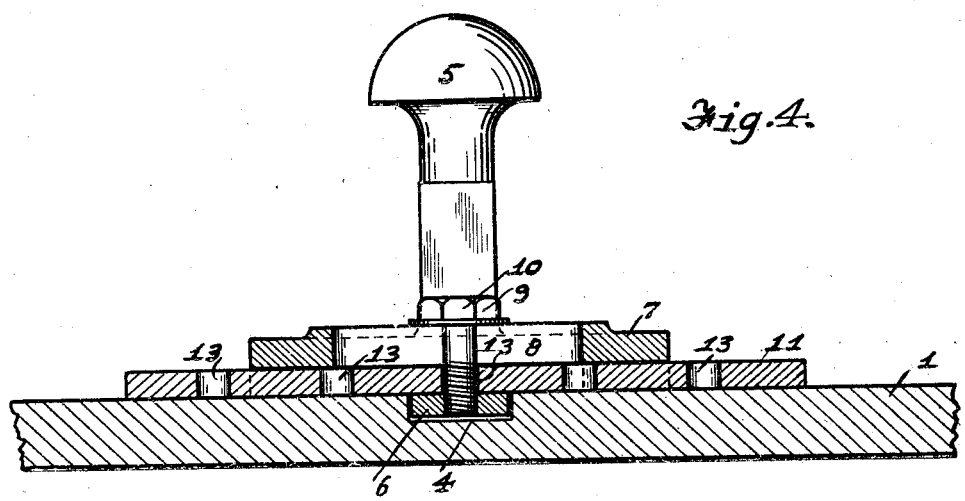
Figure 4 is a vertical transverse sectional view of the mechanism taken on line 4—4 of Figure 2.

In these drawings, a wood-working machine is shown having a horizontal table 1 and a tool, in this case a circular saw 2 extending upwardly through a slit 3 in the table. The table has a guideway or groove 4 extending in the direction of the tool. The work carrier is moved along this guideway by hand grasping its knob handle 5 to carry the workpiece to and through the field of the tool's operation.

This carrier mechanism comprises a number of relatively movable parts, viz: a first member or slide 6 slidable in and guided by said guideway; a second member or base 7 (having the knob handle 5) carried by member 6 and slidable thereon in its transverse direction, i. e. in a direction transverse to the guideway. To provide for this movement the second member 7 has transversely extending slots 8, through which pass screws 9 threaded in the first member 6 and having heads 10 pressing on the upper surface of the second member 7 to clamp the same in desired slid position. Between these members 6 and 7 are positioned flat cross bars 11 extending on each side of the guideway and slidably bearing on the surface of the table. These cross bars are slidable in recess bearings 12 in the under side of the second member 7 and have openings 13 spaced in their longitudinal direction through which the clamping screws 9 pass. This second member 7 has a round vertical post 14 received in the bearing 15 of a third member or collar 16 which turns and slides vertically on this post.

The said third member 16 has a rotary bearing 17 axially horizontal or transverse to the axis of post 14, this bearing 17 receiving the journal portion 18 of a fourth member or yoke 19 which is thus turnable relatively to the third member 16. This fourth member has spaced arms 20 between which are received the short arms 21 of the work-holder 22, a pintle pin 23 passing through bearings in all four arms, so that this work-holder is turnable relatively to the fourth member 19. This work-holder has a flat body part 24 to whose lower edge the work-supporting ledge 25 may be attached and to whose front surface the face plate 26 may be applied.

This body part 24 has slots 27 therethrough extending in said part's longitudinal direction, screw bolts 28 having nuts 29 extending through these slots and through orifices 30 in the face plate 26 serving to clamp these parts together and the face plate in desired slid position in its longitudinal direction. The ledge 25 has openings or rearwardly open slots 31 through which and into recesses 32 extending upwardly from the body part's lower edge, pass the shanks 33 of bolts 34 whose heads 35 engage the ledge 25 on its under side. Screws 36 threaded in the body part 22 extend into the recesses 32 and into engagement with the shanks of these bolts. The sides of such shanks thus engaged are desirably flattened and are inclined upwardly and outwardly as shown at 37 in Figure 3, to thus prevent their losing out of the recesses 32 when the screws 36 are loosened sufficiently to permit the ledge 25 to be withdrawn from the screws' heads and shanks, the inclined sides 37 also tending to force the bolts upwardly under the screws' pressure.

The members 7, 16, 19 and 22 or various pairs thereof which turn relatively to each other have flat surfaces to which the arms of a suitable mitre gage or angle-measuring device having pivotally connected arms may be applied to adjust the angles of said members' inclination. Thus, the second member 7 has the flat surface 38 on which one arm of such gage may be placed and the third member 16 the flat surface 39 on which the other arm of the gage may be placed, the gage's pivotal axis being vertical; said third member also has the flat surface 40 on which one arm of the gage may be placed and the fourth member 19 the flat surface 41 on which the other arm of the gage may be placed, the gage's pivotal axis being horizontal; and said fourth member has also the flat surface 42 on which one arm of the gage may be placed and the workholder 22 the flat surface 43 on which the gage's other arm may be placed, the gage's pivotal axis being horizontal.

Various means for adjusting relatively turnable members or parts in turned position are shown: The split collar portion 44 of the third member 16 may be compressed on the post 14 by the screw 45 to hold this third member in turned and also in elevated position; or this same member may be thus held by the rod 46 slidable in a vertical bearing 47 in this member's collar portion. This rod is held in slid position in said bearing by a set screw 48, and its lower end may rest on the second member 7 to thus hold the third member elevated or may engage in any of the keeper holes 49 angularly spaced about the axis of post 14 to hold the third member 16 in turned position.

The fourth member 19 may be held in turned position by screw 50 in the split collar portion 51 of the third member 16, or by the set screw 52 whose inner end seats in keeper holes 53; and the work-holder 22 may be held in turned position on the pintle pin 23 by its sector 55 through whose slot 56 the binding screw 57 passes, or a set screw 58 may be turned into the keeper holes 59.

The invention being intended to be pointed out in the claims is not to be limited to or by details of construction of the particular embodiment thereof illustrated by the drawings or hereinbefore described.

I claim:

1. In an organization of the character described the combintion with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the base member turnably about a vertical axis to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions.

2. In an organization of the character described the combination with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the base member turnably about a vertical axis and slidably therealong to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions.

3. In an organization of the character described the combination with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the base member turnably about a vertical axis to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions; a cross bar between the slide and the base member bearing slidably on the table and on the base member and having spaced-openings, the base member having a slot elongated in a direction transverse of the guideway; a headed screw extending through the slot and one of the openings and threaded in the slide member for clamping the parts together.

4. In an organization of the character described the combination with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the base member turnably about a vertical axis to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions, the collar member having a vertical bearing disposed parallelly with the axis on which it turns; a rod slidable to adjustably secured positions in said bearing and resting on the base member to support the collar member in elevated position.

5. In an organization of the character described the combination with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the second-mentioned member turnably about a vertical axis to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions, the base member having keepers angularly spaced about the axis on which the collar member turns, and the collar member having a vertical bearing disposed parallelly with its said axis of turning; a rod slidable in said bearing to a position engaging one of the keepers to hold the collar member in turned position, and also slidable to adjustably secured positions in said bearing and in resting position on the base member to support the collar member in elevated position.

6. In an organization of the character described the combination with a table having a tool mounted in connection therewith and a guideway extending toward the tool, of a work carrier comprising: a slide member slidably guided in the guideway; a base member carried by the slide member slidably transversely thereof to adjustably fixed positions; a collar member carried by the base member turnably about a vertical axis to adjustably fixed positions; a yoke member carried by the collar member turnably, about an axis transverse to the first-mentioned axis, to adjustably fixed positions; a work holder carried by the yoke member turnably, about an axis transverse to the second-mentioned axis, to adjustably fixed positions, the members of a pair thereof which are turnable relatively to each other having flat surfaces adapted to have applied thereto the arms of a mitre gage to adjust the angle of said members' relative inclination.

7. In an organization of the character described, a work holder comprising: a body part having a bearing extending upwardly from its lower edge; a work supporting ledge having an opening therethrough and adapted to be applied against the lower edge of the body part; a bolt having a head engaging the ledge and a shank extending through said opening and into the bearing, the shank having an outwardly-upwardly inclined side; a set screw threaded in the body part and extending into the bearing to holding engagement with said inclined side.

In testimony whereof I have hereunto set my hand at Grand Rapids, Michigan, this 21st day of December, 1929.

CORNELIUS KOSTER.